(12) United States Patent
Kim et al.

(10) Patent No.: US 12,608,564 B2
(45) Date of Patent: Apr. 21, 2026

(54) METHOD AND DEVICE FOR STEPWISE PURIFICATION OF SENTENCES WITH GENERATIVE ARTIFICIAL INTELLIGENCE

(71) Applicant: Sangmyung University Industry—Academy Cooperation Foundation, Seoul (KR)

(72) Inventors: Manseo Kim, Seoul (KR); Jonghan Kim, Seoul (KR); Sungchan Ahn, Seoul (KR); Woosung Jung, Seoul (KR); Suhwan Jo, Seoul (KR); Sung Jun Park, Seoul (KR)

(73) Assignee: Sangmyung University Industry—Academy Cooperation Foundation, Seoul (KR)

( * ) Notice: Subject to any disclaimer, the term of this patent is extended or adjusted under 35 U.S.C. 154(b) by 278 days.

(21) Appl. No.: 18/522,709

(22) Filed: Nov. 29, 2023

(65) Prior Publication Data

US 2025/0094729 A1 Mar. 20, 2025

(30) Foreign Application Priority Data

Sep. 15, 2023 (KR) ........................ 10-2023-0123130

(51) Int. Cl.
*G06F 40/40* (2020.01)
*G06F 16/332* (2025.01)
*G06F 16/338* (2019.01)

(52) U.S. Cl.
CPC .......... *G06F 40/40* (2020.01); *G06F 16/3326* (2019.01); *G06F 16/338* (2019.01)

(58) Field of Classification Search
CPC .... G06F 40/40; G06F 16/3326; G06F 16/338; G06F 40/289; G06F 40/30; G06F 40/205;
(Continued)

(56) References Cited

U.S. PATENT DOCUMENTS

2022/0343066 A1* 10/2022 Kwong ................. H04M 1/271
2024/0370660 A1* 11/2024 Cha ......................... G06T 11/00

FOREIGN PATENT DOCUMENTS

KR 20230059859 A * 5/2023 ........... G06N 3/0464
KR 102552297 B1 7/2023

OTHER PUBLICATIONS

Mohamed et al, Literature Survey: Data-driven Approach for Selection of an Ensemble Model of Profane Words Detection in Social Media, International Journal of Scientific & Engineering Research vol. 9, Issue 10, Oct. 2018, pp. 417-429 (Year: 2018).*
(Continued)

*Primary Examiner* — Linda Wong
(74) *Attorney, Agent, or Firm* — Panitch Schwarze Belisario & Nadel LLP

(57) ABSTRACT

Provided is a method of generating stepwise purified sentences using a deep learning-based interactive model. The method includes receiving input sentences by a user's terminal, detecting malicious words in the input sentences, and generating a plurality of stagewise purified sentences using a plurality of types of purification including purification of the malicious words according to stepwise sentence purification, by a language purification model part of a stepwise purified sentence generation system, and presenting, by the terminal, the plurality of stepwise purified sentences to a user to allow the user to select one of the plurality of stepwise purified sentences, and transmitting, by the terminal, the selected stepwise purified sentence to the stepwise purified sentence generation system to determine a final purified sentence.

14 Claims, 8 Drawing Sheets

(58) Field of Classification Search
CPC .. G06F 16/31; G06F 16/3329; G06F 16/3334;
G06F 40/263; G06F 40/279; G06N 3/045;
G06N 3/0475; G06N 3/09; G06N 3/092;
G06N 3/096; G06N 3/0985
See application file for complete search history.

(56) References Cited

OTHER PUBLICATIONS

Puengsom et al, Social Media Profanity Word Filtering System Development, 2025 22nd International Conference on Electrical Engineering/Electronics, Computer, Telecommunications and Information Technology, Aug. 8, 2025 (Year: 2025).*

Willem et al, Detecting Racist and Bad Words using Text Mining in Social Media, 2021 8th International Conference on Information Technology, Computer and Electrical Engineering, Dec. 3, 2021 (Year: 2021).*

Chen et al, Detecting Offensive Language in Social Media to Protect Adolescent Online Safety, 2012 International Conference on Privacy, Security, Risk and Trust and 2012 International Conference on Social Computer, Jan. 10, 2013 (Year: 2013).*

Henrik Axelson et al., "Can AI Moderate Online Communities?," ARXIV:2306.05122, https://doi.org/10.48550/ arXiv.2306.05122, Jun. 8, 2023; (14 pages).

Ju-Hyoung Lee et al., "Detecting context abusiveness using hierarchical deep learning," Proceedings of the 2nd Workshop on NLP for Internet Freedom: Censorship, Disinformation and Propaganda, Association for Computational Linguistics, Nov. 4, 2019 (pp. 10-19).

Ke Wang et al., "Controllable Unsupervised Text Attribute Transfer via Editing Entangled Latent Representation," 33rd Conference on Neural Information Processing Systems (NeurIPS 2019), arXiv:1905, 12926v2, Dec. 12, 2019, (11 pages).

* cited by examiner

METHOD AND DEVICE FOR STEPWISE PURIFICATION OF SENTENCES WITH GENERATIVE ARTIFICIAL INTELLIGENCE

CROSS-REFERENCE TO RELATED APPLICATION

This application is based on and claims priority under 35 U.S.C. § 119 to Korean Patent Application No. 10-2023-0123130, filed on Sep. 15, 2023, in the Korean Intellectual Property Office, the disclosure of which is incorporated by reference herein in its entirety.

BACKGROUND

1. Field

The disclosure relates to a method and a device for purifying sentences by using generative artificial intelligence (AI), and more particularly, to a method and a device for stepwise purification of sentences.

2. Description of the Related Art

Currently, some online content could cause serious psychological and emotional damage to users. Such problematic online content may include offensive or hateful content and expressions that defame or discriminate against specific individuals, groups, religions, races, and the like. Accordingly, online platforms are required to prepare countermeasures to maintain a healthy and safe communication environment. The existing automatic filtering and monitoring systems have limitations in censorship and deletion, thereby making it difficult to preserve the freedom of expression.

Among the existing methods of censoring malicious sentences using artificial intelligence (AI), Naver's "Cleanbot 2.0" uses a transfer learning method which involves performing representation learning between two sentences and learning the similarity between the two sentences through Persona Embedding, thereby learning the similarity between malicious and non-malicious sentences. In addition, automated machine learning (AutoML) of Naver's Clova AI is combined with a method to complete a final model, and malicious sentences are classified using the same.

ChatGPT, which is mentioned in this disclosure as an example of a transfer learning model, is a model that combines a large language model (LLM) that predicts words and sentences with reinforcement learning from human feedback (RLHF) for accelerating or improving agent learning based on human feedback. After conducting supervised learning with reliable questions and answers, the results of ranking the various answers generated by asking questions to the model by evaluating whether the answers match the questioner's intention are databased, thereby being able to predict the answer priority through iterative learning. Thereafter, a proximal policy optimization (PPO) algorithm is used for fine-tuning some or all of parameters of the language model and fine-tuning the answers generated from new questions rather than the learned questions.

The related art for purifying malicious comments that appear on the Internet is limited to simply detecting malicious comments or simply generating purified sentences to replace the malicious comments. This simple purification of sentences does not effectively address the psychological and emotional damage caused by malicious comments, which is worsening day by day.

SUMMARY

The disclosure presents a method and a device for stepwise purification of sentences or text in online content by using generative artificial intelligence (AI) technology.

The disclosure presents a method and a device capable of responding to malicious posts and preventing damage by providing purified sentences.

In addition, the disclosure presents a method and a device capable of creating a healthy communication culture on an online platform and providing a foundation for users to freely share opinions in a safe and positive environment, through stepwise purification of sentences.

Additional aspects will be set forth in part in the description which follows and, in part, will be apparent from the description, or may be learned by practice of the presented embodiments of the disclosure.

According to the disclosure, a method of generating stepwise purified sentences using a deep learning-based interactive model may include receiving input sentences by a user's terminal, detecting malicious words in the input sentences, and generating a plurality of stagewise purified sentences using a plurality of types of purification including purification of the malicious words, i.e., stepwise sentence purification, by a language purification model part of a stepwise purified sentence generation system, and presenting the plurality of stepwise purified sentences to the user so that the user selects one of the plurality of stepwise purified sentences, and transmitting the selected stepwise purified sentence to the stepwise purified sentence generation system to determine a final purified sentence, by the terminal.

According to one or more embodiments, the language purification model part may include a reinforcement learning from human feedback (RLHF)-based large language model (LLM).

According to one or more embodiments, the stepwise sentence purification may be performed at least three times, and results from each stage of the method of stepwise purification of sentences may be stored in a database, where the purified sentences stored in the database may be presented to and selected by the user.

According to one or more embodiments, the language purification model part may include a single model, and when a prompt for each stage from a prompt engineering part is input to the single model, the single model may repeatedly perform different types of sentence purification given at each stage.

According to one or more embodiments, the different types of sentence purification may include masking of malicious words, replacement of masked words with purified terms, and softening of the entire sentence.

According to one or more embodiments, after the terminal receives the input sentences, the stepwise purified sentence generation system may pre-process the input sentences, and then the language purification model part may purify the input sentences.

According to one or more embodiments, the language purification model part may include a plurality of models specialized for each stage, and each model may perform different types of sentence purification given to each stage.

According to one or more embodiments, the different types of sentence purification may include masking of malicious words, replacement of masked words with purified terms, and softening of the entire sentence.

According to one or more embodiments, after the terminal receives the input sentences, the stepwise purified sentence generation system may pre-process the input sentences, and then the language purification model part may purify the input sentences.

A stepwise purified sentence generation system that purifies input sentences from a user's terminal may include a model part configured to detect malicious words in the input sentences and generate a plurality of stepwise purified sentences using a plurality of types of purification including purification of the malicious words, an output post-process part configured to store purified sentences from the model part in a database, and an answer provision part configured to transmit purified sentences generated from the model part to the user's terminal, wherein the stepwise purified sentence generation system may determine the purified sentence selected through the terminal as a final purified sentence.

According to one or more embodiments, the model part may include a RLHF-based LLM.

According to one or more embodiments, the model part may perform stepwise purified sentence generation at least three times, and store the purified sentences generated at each stage in a database, where the purified sentences stored in the database may be transmitted to the user's terminal by the answer provision part.

According to one or more embodiments, the language purification model part may include a single model, and when a prompt for each stage from a prompt engineering part is input to the single model, the single model may repeatedly perform different types of sentence purification given at each stage.

According to one or more embodiments, the different types of sentence purification may include masking of malicious words, replacement of masked words with purified terms, and softening of the entire sentence.

According to one or more embodiments, the model part may include a plurality of models specialized for each stage, and each model may be configured to perform different types of sentence purification given to each stage.

According to one or more embodiments, an input pre-process part may be provided on an input side of the model part, and an output post-process part may be provided on an output side of the model part.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram illustrating an operation of a purified sentence generation system that generates stepwise purified sentences, according to the disclosure;

FIG. 4 is a block diagram showing separated functional elements of a single model-type purified sentence generation system 200 which performs stepwise sentence purification using one model, according to the disclosure;

DETAILED DESCRIPTION

Figure 1:
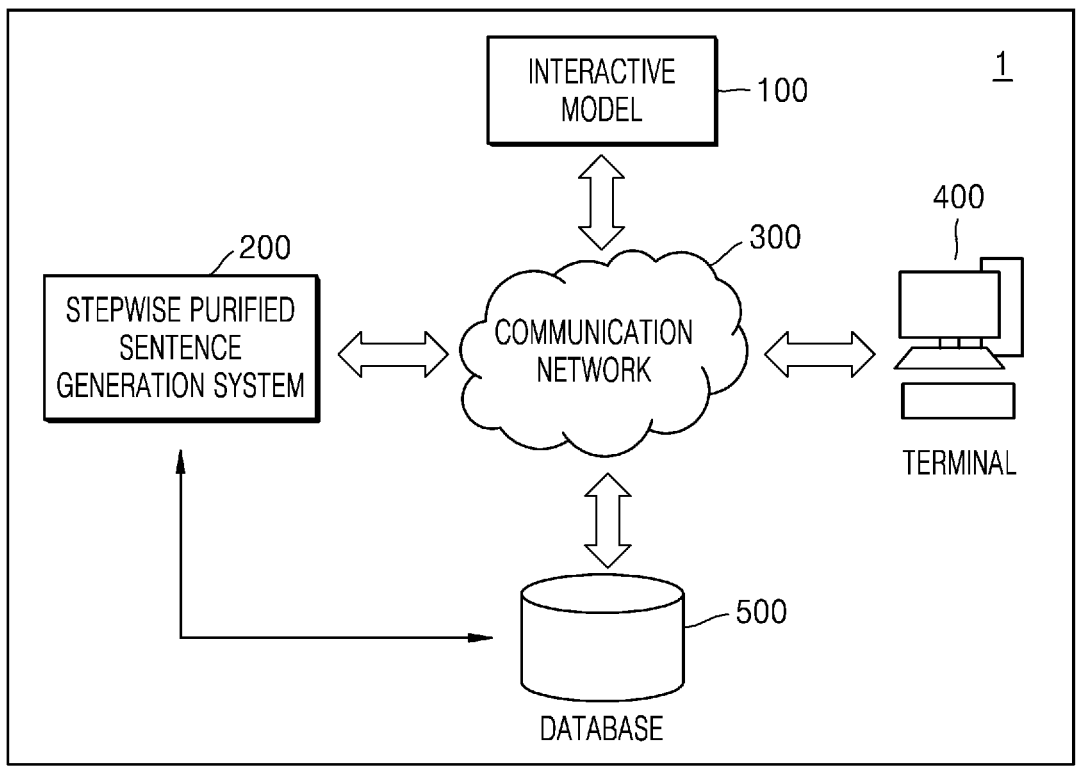
FIG. 1 is a schematic diagram showing an overall configuration of an interactive artificial intelligence system according to the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms such as first, second, etc. may be used to describe various components, but the components are not limited by the terms. The above terms are used only for the purpose of distinguishing one component from another. For example, a first component may be named a second component, and conversely, the second component may be named the first component without departing from the scope of the invention concept.

The terms used in this application are merely used to describe specific embodiments and are not intended to limit the inventive concept. Singular expressions include plural expressions unless the context clearly dictates otherwise. In this application, expressions such as "comprises" or "has" are intended to designate the presence of features, numbers, steps, operations, components, parts, or combinations thereof described in the specification, but are not intended to preclude the presence or addition of one or more other features, numbers, operations, components, parts, or combinations thereof.

Unless otherwise defined, all terms used herein, including technical terms and scientific terms, have the same meaning as commonly understood by those skilled in the art in the technical field to which the inventive concept pertains. In addition, the commonly used terms, as defined in the dictionary, should be interpreted to have a meaning consistent with the one in the context of the relevant technology, and should not be interpreted in an overly formal sense unless explicitly defined herein.

In cases where some embodiments are implementable differently, a specific process sequence may be performed differently from the described sequence. For example, two processes described in succession may be performed substantially at the same time, or may be performed in an order opposite to the order as described herein.

Hereinafter, a method and a system for stepwise purification of sentences according to one or more embodiments are described in detail.

FIG. 1 is a schematic diagram showing an overall configuration of an interactive artificial intelligence system according to the disclosure.

Referring to FIG. 1, in an interactive artificial intelligence system 1 according to the disclosure, an interactive model 100, a stepwise purified sentence generation system 200, and a terminal 400 are arranged around a communication network 300 such as the Internet. A database 500, which is accessed by the stepwise purified sentence generation system 200, may be connected locally to a LAN or may be placed within the stepwise purified sentence generation system 200.

The interactive model 100 at the top of the interactive artificial intelligence system 1 according to the disclosure is capable of understanding natural language sentences input by a user through the terminal 400 and extracting meanings therefrom based on natural language processing technology, thereby generating answers based on previously learned knowledge or data. For example, a generative pre-trained transformer (GPT) model capable of understanding and generating languages by pre-training on large-scale text data or a model in the form of new results from transfer learning, especially a new model capable of effectively processing Korean or other languages may be applied to the interactive model 100.

The terminal 400 through which the user accesses the stepwise purified sentence generation system 200 on the web, to be described below, is a device that inputs the user's query and displays an answer accordingly. The user's query basically includes text input, and voice signals may be received and converted into text, according to some embodiments. The conversion of the voice signals into text may be performed by the terminal 400, or may be performed by a general algorithm in the stepwise purified sentence generation system 200 connected to the terminal 400, according to some embodiments. The terminal 400 may include all types of interactive electronic devices including desktop PCs, portable PCs, laptop computers, Android terminals, iOS terminals, and the like connectable to the stepwise purified sentence generation system 200.

According to the disclosure, the stepwise purified sentence generation system 200 performs a process of stepwise (N stages) sentence purification using one model or a plurality of models, and generates stepwise purified sentences at each stage. In this process, prompt engineering is used to guide the user to divide the process into N stages, thereby generating sentences according to purification standards for each stage.

The sentence purification model may be a model obtained by applying reinforcement learning from human feedback (RLHF) to large language models (LLM), which are trained using a large amount of data. The LLM is a type of natural language processing model trained based on large-scale text data, and is designed to receive original text or sentences as input and use other natural language generation models within the model to generate more natural and consistent text. The RLHF, as a method of training a machine learning model, is a technique to improve the model using human feedback, and is related to reinforcement learning.

The sentence purification model generated using the method may be a single model-type or a multi-model-type according to an embodiment. In an embodiment of a multi-model-type sentence purification model, for example, three or more N models may be used.

Individually trained models for each purification stage may be applied to the multi-model-type sentence purification model. The individually trained models for each purification stage may be fine-tuned for adjusting weights and parameters tailored to the relevant stage and learning additional data.

Fine tuning is a technique to better suit the purpose of use of the models and improve performance by adjusting the weights and parameters of the existing learned model or updating the model by learning additional data.

The above-described database 500 updateably stores data related to stepwise purified sentence generation generally using the structured query language (SQL), receives a query from the stepwise purified sentence generation system 200, generates an answer accordingly, and delivers the answer to the system 200, wherein the system 200 transmits results corresponding to the user's query or input to the terminal 400.

The communication network 300 includes most existing wired and wireless communication systems such as the Internet, WAN, wired LAN, wireless LAN, 3G, 4G, 5G, and LTE, and communication protocols are also applied thereto, wherein the technical scope of the communication network 300 of the disclosure is not limited by a specific system or a specific protocol.

Figure 2:
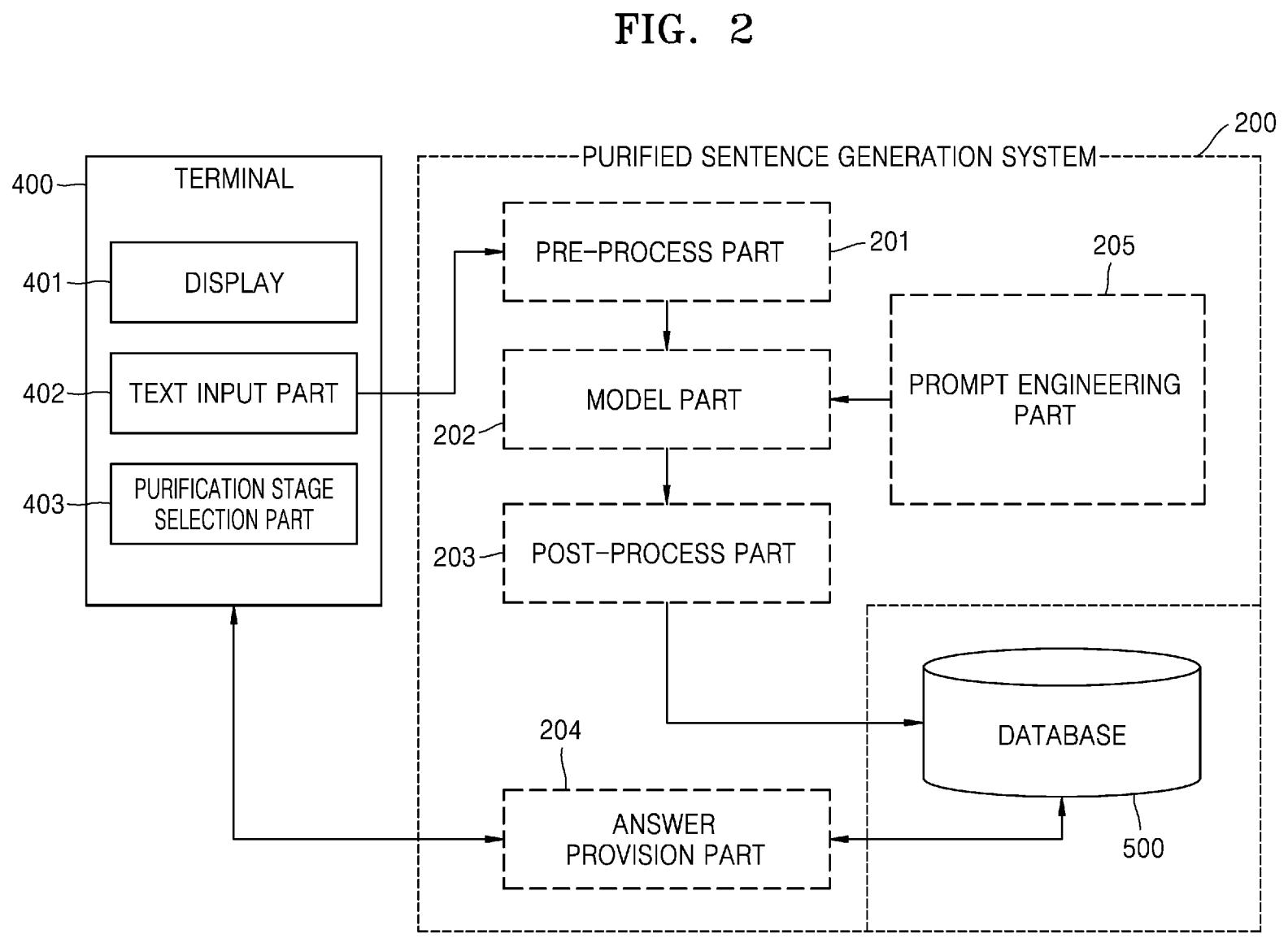

FIG. 2 is a block diagram illustrating the operation of a purified sentence generation system that generates stepwise purified sentences, according to the disclosure.

In the disclosure, when malicious sentences or malicious comments are input, stepwise purified sentences are presented through a stepwise purification process rather than a single purification process, and the user is asked to select one of the stepwise purified sentences.

The terminal 400 is a hardware- and app-based internal device having a general structure and includes a display 401, a text input part 402, and a purification stage selection part 403 that allows the user to select one of several purified sentences.

The purified sentence generation system 200 includes a pre-process part 201 that performs pre-processing on the input sentences, such as removing punctuation and spacing, unifying the case, and replacing special characters, and tokenizes the pre-processed sentences. The input sentences that have passed through the pre-process part 201 are converted into a plurality of purified sentences in a stepwise sentence purification model part 202, and the plurality of purified sentences pass through a post-process part 203 that detects errors during conversion, and then are stored in the database 500. An answer provision part 204 detects the purified sentences in the database 500 through polling and sends the same to the terminal 400, and the user checks the purified sentences displayed on the display 401 and selects one of the purified sentences through the purification stage selection part 403 equipped with an input device such as a keyboard or a mouse.

One of the purified sentences is provided for each stage, allowing the user to select or unselect the purified sentence corresponding to each stage. When the user unselects the purified sentence, the subsequent purified sentence is provided to and selected by the user.

The purified sentences may be provided one by one, but several purified sentences obtained through a stepwise purification process may be displayed at once so that the user can select a specific purified sentence at once.

In the purified sentence generation system 200 shown in FIG. 2, the stepwise sentence purification model part 202 may include a single model used in all stages or a plurality of models specialized for each stage.

The prompt engineering part 205 provided in the purified sentence generation system 200 presents prompts for stepwise models, which provide model-specific instructions at each stage when performing stepwise sentence purification under different conditions using a single model. When the model part 202 has multiple individual models specialized for each purification stage, the prompt engineering part 205 may only provide a simple prompt, for example, "please purify this sentence." In this case, the unique function of the prompt engineering part 205 may be excluded.

Figure 3:
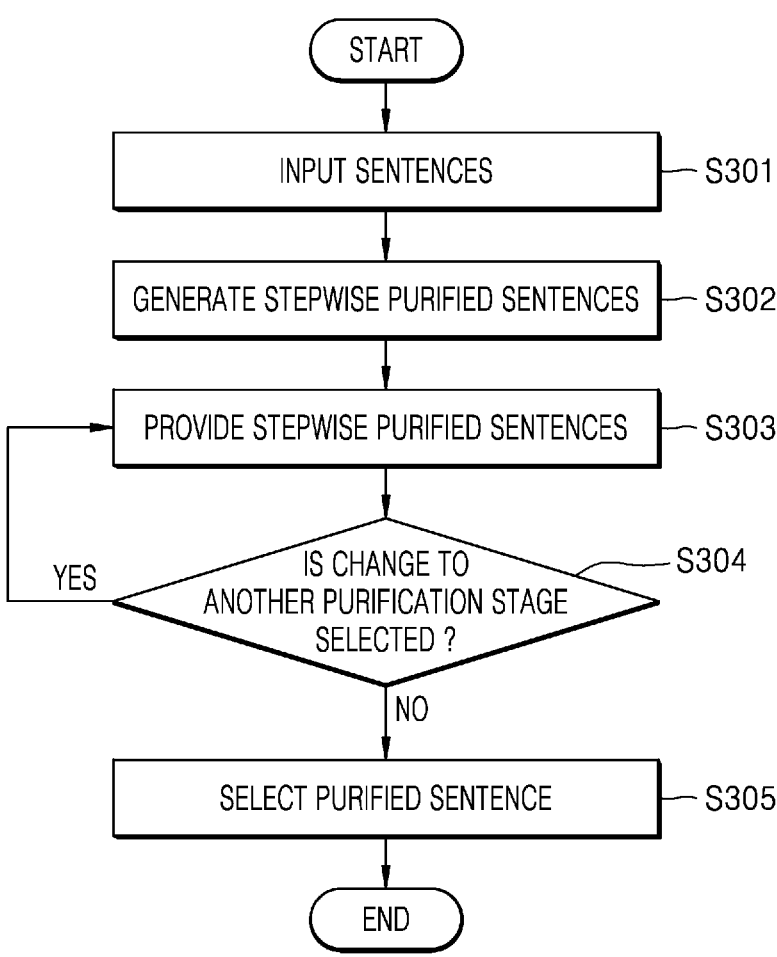
FIG. 3 is a flowchart illustrating a process of presenting stepwise purified sentences to explain the basic concept of the disclosure.

FIG. 3 is a flowchart illustrating a process of presenting stepwise purified sentences to explain the basic concept of the disclosure.

As shown in FIG. 3, when a conversation with an artificial intelligence system begins and a user inputs a query (S301), the purified sentence generation system 200 generates purified sentences for malicious sentences step by step based on the user's input sentences (S302), and the purified sentences generated in stage S302 are transmitted to the user's terminal and displayed on a display (S303) so that the user selects a stepwise purified sentence in the following stage. If the user selects the change to another purification stage, it may return to stage S302 to generate purified sentences in the following stage, and if not, the corresponding purified sentence is selected (S305) to complete the process of generating the purified sentences.

Figure 4:
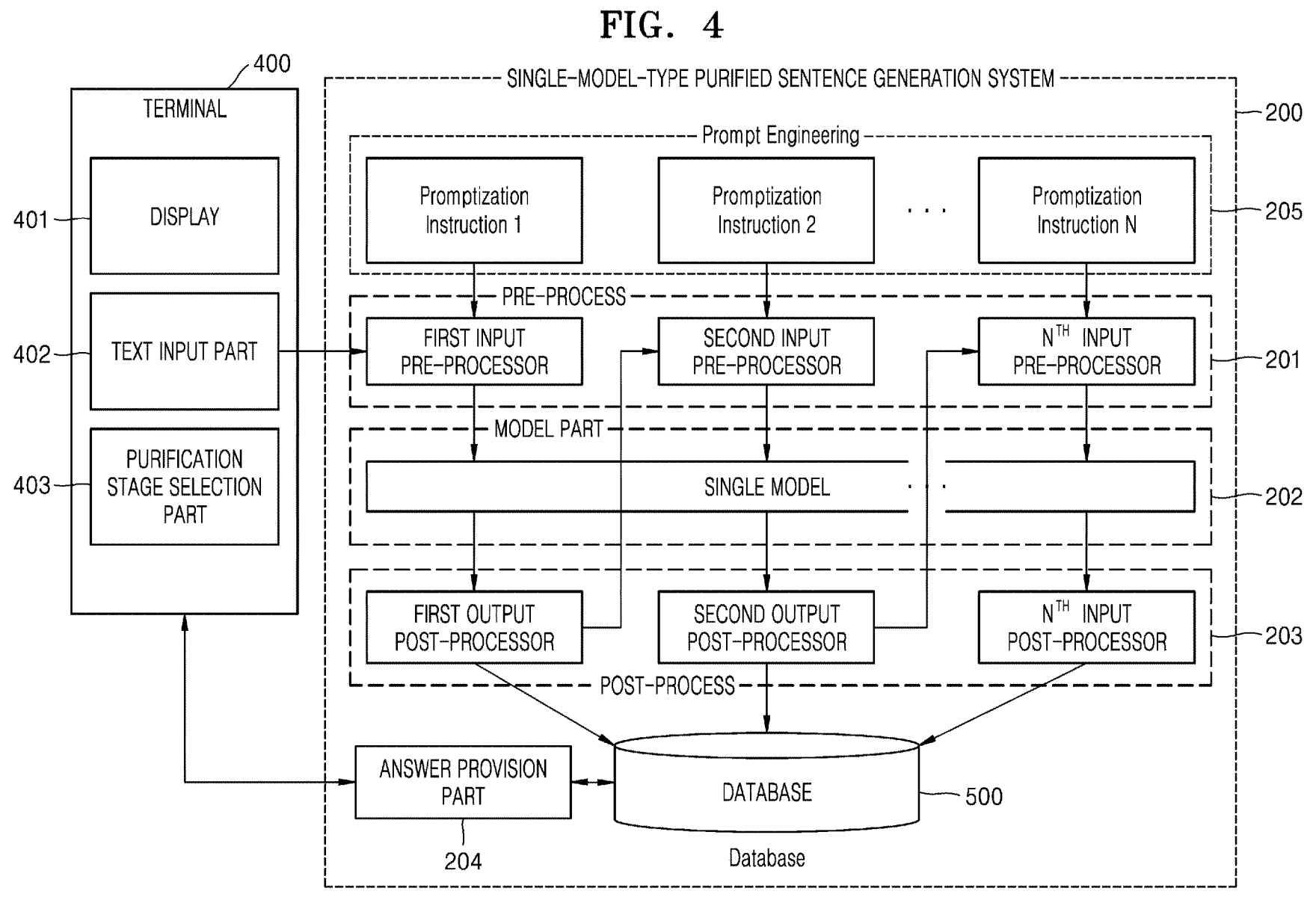

FIG. 4 is a block diagram showing separated functional elements of a single model-type purified sentence generation system 200 which performs stepwise sentence purification using one model, according to the disclosure.

As described above, the terminal 400 is a hardware- and app-based internal device and includes the display 401, the text input part 402, and the purification stage selection part 403 that allows the user to select one of several purified sentences.

The purified sentence generation system 200 includes a plurality of pre-process parts 201 that pre-process and tokenize the input sentences. The pre-process part 201 in FIG. 4 has at least three pre-processors, for example, the first, second, and N input pre-processors, and correspondingly, the post-process part 203 also includes first, second, and N output post-processors for each stage.

In the above pre-processors and post-processors, all or part of the remaining parts excluding the first input pre-processor and the N$^{th}$ output post-processor may be selectively excluded depending on design conditions, etc.

The first output post-processor, the second output post-processor, and the N$^{th}$ output post-processor send the purified sentences generated in the corresponding stage to the database 500 for storage.

Once the model part 202 has one model, the model part 202 receives the corresponding promptization instruction from the prompt engineering part 205 at each stage, performs sentence purification at the given stage, and generates and sends an appropriate purified sentence to the corresponding output post-processor. A first purified sentence from the first output post-processor may be sent to a second input pre-processor or a second model, and a second purified sentence from the second output post-processor is sent to the next input pre-processor, for example, the N$^{th}$ input pre-processor.

As described above, the answer provision part 204 detects generated purified sentences in the database 500 through polling, and sends the purified sentences to the terminal 400. The user checks the purified sentences displayed on the display 401 and selects one purification sentence through the purification stage selection part 403 equipped with an input device such as a keyboard or a mouse.

Figure 5:
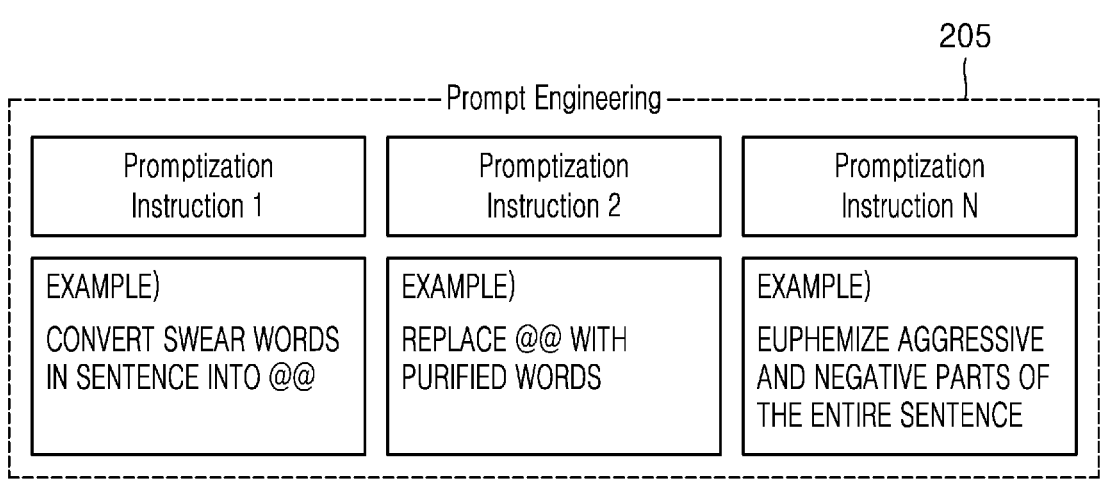
FIG. 5 is a diagram of a prompt engineering part 205 showing stepwise instructions, that is, prompts for first, second, and $N^{th}$ models, in a stepwise sentence purification method according to the disclosure.

FIG. 5 is a diagram of a prompt engineering part 205 showing stepwise instructions, that is, prompts for first, second, and N$^{th}$ models.

As shown in FIG. 5, in a first stage, masking is performed to prevent inappropriate terms such as slang and swear words from being visible. In a second stage, the masked terms are replaced with appropriate purified terms. In a final N stage, the expressions are softened by euphemizing aggressive and negative parts of the entire sentence. The disclosure as described above purifies sentences in various ways, such as masking of swear words, purification of masked swear words, and softening of the entire sentence, rather than simple substitution. Since one model is applied to the stepwise sentence purification process using a single model described above, the prompt engineering part 205 is required for sentence purification at each stage. However, in some embodiments, when a plurality of models trained separately according to the purification level and purification type of each stage are applied to each stage, the prompt engineering part 205 may be excluded, and a simple prompt may be sent to each model, such as "please purify the sentence."

Figure 6:
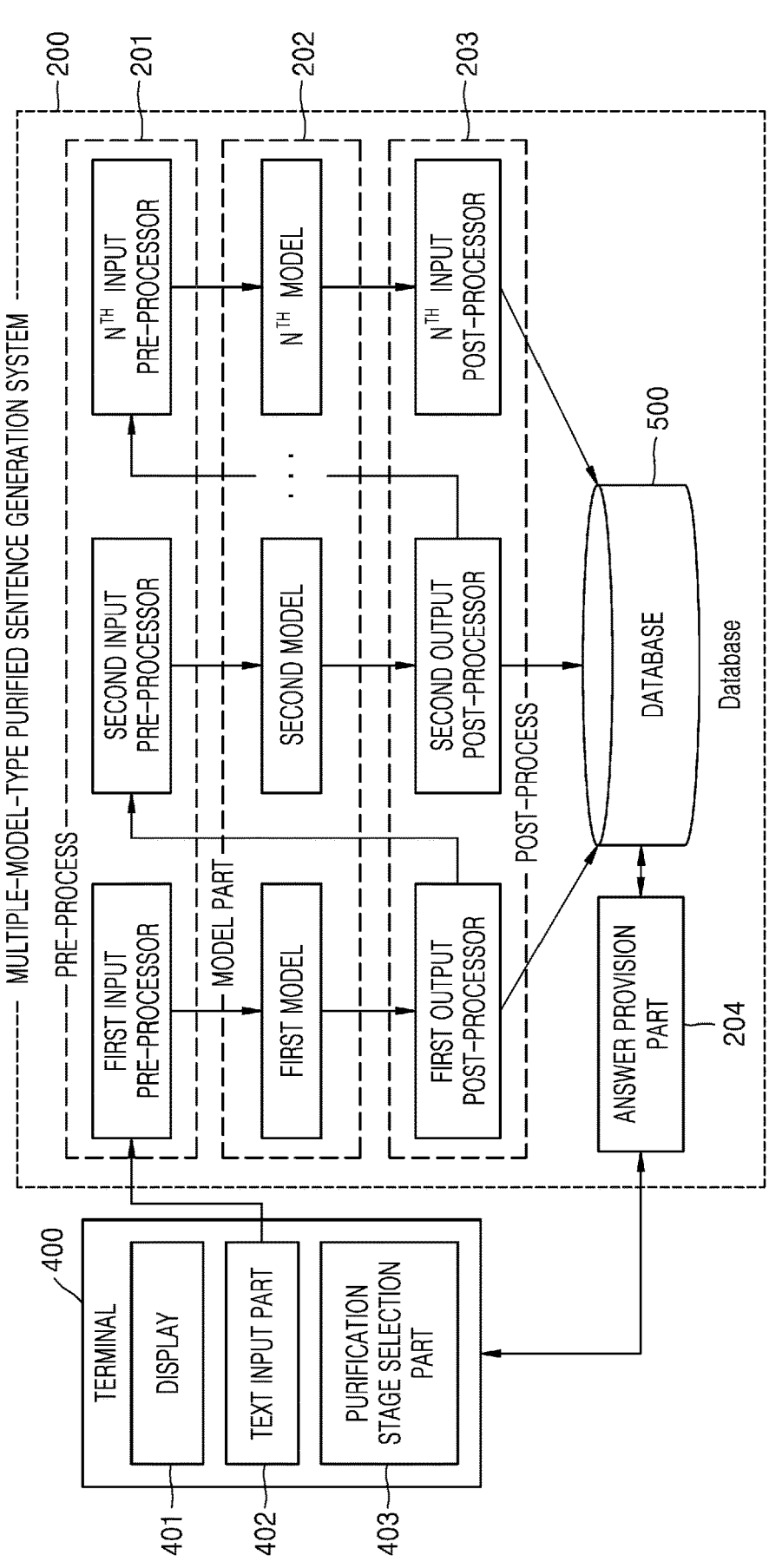
FIG. 6 is a block diagram showing a stepwise sentence purification structure using a plurality of models trained for each stage as described above, in the stepwise sentence purification method according to the disclosure.

FIG. 6 is a block diagram showing a stepwise sentence purification structure using a plurality of models trained for each stage, for example, the first model, the second model, and the N model, as described above.

As shown in FIG. 6, the system 200 of FIG. 6 excludes the prompt engineering part 205 that is present in the system 200 of FIG. 4. According to the sentence purification structure in which the plurality of models are used, in the above pre-processors and post-processors, all or part of the remaining parts excluding the first input pre-processor and the N$^{th}$ output post-processor may be selectively excluded depending on design conditions, etc. since each model is specialized for each stage.

Figure 7:
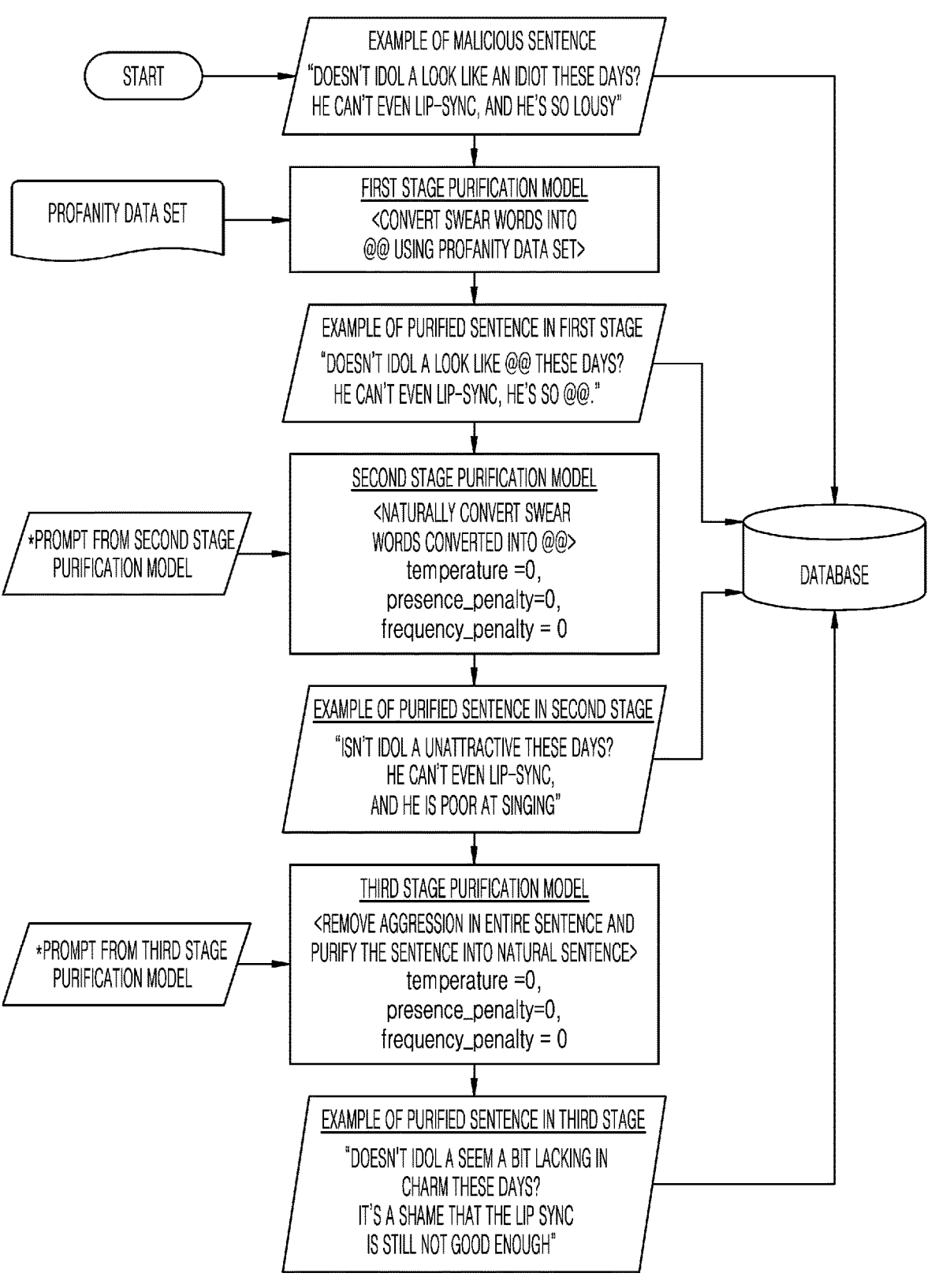
FIG. 7 is a flowchart illustrating a process of purifying specific malicious sentences according to a method and a system for stepwise sentence purification, in the stepwise sentence purification method according to the disclosure.

FIG. 7 is a flowchart illustrating a process of purifying specific malicious sentences according to a method and a system for stepwise sentence purification having the same structure as described above.

Referring to FIG. 7, when the system starts, a malicious sentence, "doesn't Idol A look like an idiot these days? he can't even lip-sync, and he's so lousy" is input. In a first sentence purification stage, a prompt is provided from the prompt engineering part to "refer to profanity data" and "convert swear words into @@, i.e., masking". A single model or a first model specialized for this stage purifies the original sentence into "doesn't Idol A look like @@ these days? he can't even lip-sync, he's so @@."

In a second sentence purification stage, the sentence "Isn't idol A unattractive these days? he can't even lip-sync, and he is poor at singing" may be generated by a single model or a second model specialized for this stage that received a prompt to "naturally convert the swear words converted into @@."

In a N$^{th}$ sentence purification stage, e.g., a third sentence purification stage, the purified sentence "doesn't Idol A seem a bit lacking in charm these days? it's a shame that the lip sync is still not good enough" may be generated by a single model or a third model specialized for this stage that received a prompt to "remove aggression in the entire sentence and purify the sentence into a natural sentence".

Figure 8:
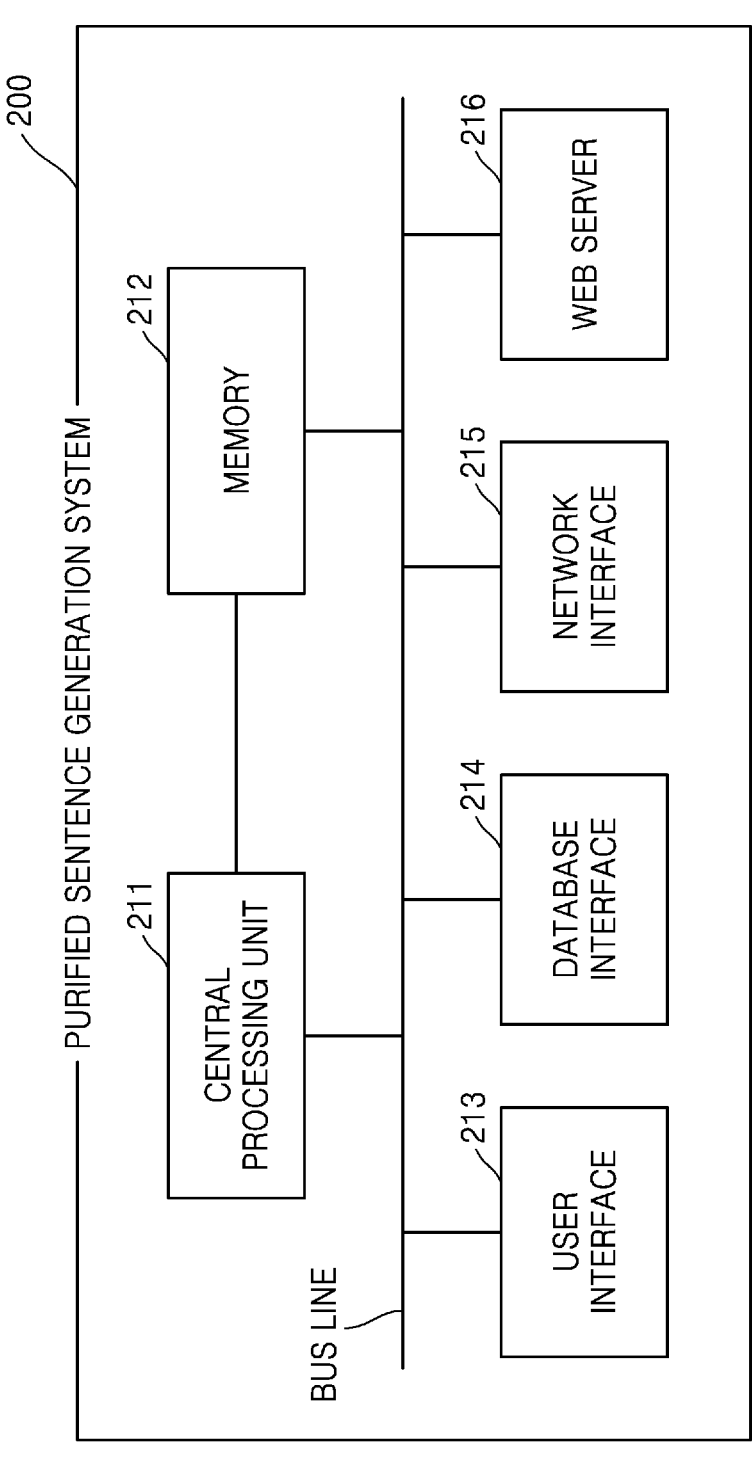
FIG. 8 is a diagram of a stepwise sentence purification system including hardware of a computer structure, according to the disclosure.

The method and the system of the disclosure as described above are built around a network environment such as the Internet, and the stepwise sentence purification system 200 has hardware of the computer structure shown in FIG. 8.

As shown in FIG. 8, the hardware for the stepwise purified sentence generation system 200 according to the disclosure has a structure of a typical computer equipped with a basic board having a central processing unit 211 and main memory 212, a user interface 213 such as a mouse, keyboard, and monitor, and a network interface 215 for communication, in addition to a database interface 214 provided by programming for access to a database, and a web server 216 for web services. The web server 216 is an interface device that allows the user to access and use a stepwise purification sentence generation device. The components of the above-described multi-model-type purified sentence generation system 200 are mainly composed of apps, some of which may be supported by specific-purpose hardware.

According to the stepwise purified sentence generation system 200 of the disclosure based on such hardware, an opportunity to view the purified sentence is provided regardless of whether or not the malicious sentence is viewed. The disclosure may provide personalized interaction by allowing users to set different degrees of purification, rather than simple purification. Since the RLHF-based LLM is applied to the disclosure, differences in each purification stage may be taken into account, resulting in improved performance.

As a result, according to the disclosure, psychological damage to the viewer is reduced by purifying malicious sentences containing criticism, swear words, and slangs directed at others in a stepwise manner. In particular, when purifying sentences, more active communication and feedback between online content users are possible because the intent of existing sentences is preserved. In addition, purified sentences induce a sympathy effect and raise awareness of writing malicious sentences, helping to improve the online environment.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of generating stepwise purified sentences using a deep learning-based interactive model, the method comprising:

receiving input sentences by a user's terminal;

detecting malicious words in the input sentences, and generating a plurality of stepwise purified sentences using a plurality of types of purification including purification of the malicious words according to stepwise sentence purification by a language purification model part of a stepwise purified sentence generation system; and presenting, by the terminal, the plurality of stepwise purified sentences to a user to allow the user to select one of the plurality of stepwise purified sentences, and transmitting, by the terminal, the selected stepwise purified sentence to the stepwise purified sentence generation system to determine a final purified sentence, wherein the language purification model part includes a model repeatedly performing different types of sentence purification given at each stage, and the different types of sentence purification include masking malicious words, replacing masked words with purified terms, and softening the entire sentence.

2. The method of claim 1, wherein the language purification model includes a reinforcement learning from human feedback (RLHF)-based large language model (LLM).

3. The method of claim 2, wherein the stepwise sentence purification is performed at least three times, and results from each stage of the method of stepwise purification of sentences are stored in a database, wherein the purified sentences stored in the database are presented to and selected by the user.

4. The method of claim 1, wherein stages of the method of stepwise purification of sentences are performed at least three times, and results from each stage of the method of stepwise purification of sentences are stored in a database, wherein the purified sentences stored in the database are presented to and selected by the user.

5. The method of claim 1, wherein the language purification model part includes a single model, and when a prompt for each stage from a prompt engineering part is input to the single model, the single model repeatedly performs the different types of sentence purification given at each stage.

6. The method of claim 5, wherein, after the terminal receives the input sentences, the stepwise purified sentence generation system pre-processes the input sentences, and then the language purification model part purifies the input sentences.

7. The method of claim 1, wherein the language purification model part includes a plurality of models specialized for each stage, and each model performs the different types of sentence purification given to each stage.

8. The method of claim 7, wherein, after the terminal receives the input sentences, the stepwise purified sentence generation system pre-processes the input sentences, and then the language purification model part purifies the input sentences.

9. A stepwise purified sentence generation system that purifies input sentences from a user's terminal, the system comprising:

a model part configured to detect malicious words in the input sentences and generate a plurality of stepwise purified sentences using a plurality of types of purification including purification of the malicious words;

an output post-process part configured to store purified sentences from the model part in a database; and a processing unit configured to detect the purified sentences in the database through polling and to send the purified sentences, generated from the model part and stored by the output post-process part, to the user's terminal, wherein the stepwise purified sentence generation system is configured to determine the purified sentence selected through the terminal as a final purified sentence, wherein the model part includes a model repeatedly performing different types of sentence purification given at each stage, and wherein the different types of sentence purification include masking malicious words, replacing masked words with purified terms, and softening the entire sentence.

10. The system of claim 9, wherein the model part includes a reinforcement learning from human feedback (RLHF)-based large language model (LLM).

11. The system of claim 9, wherein the model part performs stepwise purified sentence generation at least three times, and stores the purified sentences generated at each stage in a database, wherein the purified sentences stored in the database are transmitted to the user's terminal.

12. The system of claim 9, wherein the model part includes a single model, and a prompt for each stage from a prompt engineering part is input to the single model so that the single model repeatedly performs the different types of sentence purification given at each stage.

13. The system of claim 9, wherein the model part includes a plurality of models specialized for each stage, and each model is configured to perform the different types of sentence purification given in each stage.

14. The system of claim 9, wherein an input pre-process part is provided on an input side of the model part, and an output post-process part is provided on an output side of the model part.

* * * * *